United States Patent
Bleeck et al.

(10) Patent No.: US 9,551,432 B2
(45) Date of Patent: Jan. 24, 2017

(54) SOLENOID VALVE WITH REDUCED CAVITATION

(71) Applicant: Continental Automotive GmbH, Hannover (DE)

(72) Inventors: Matthias Bleeck, Pentling (DE); Bernd Gugel, Regensburg (DE); Thomas Krueger, Themar (DE); Andreas Muehlbauer, Cham (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days.

(21) Appl. No.: 14/435,403

(22) PCT Filed: Oct. 10, 2013

(86) PCT No.: PCT/EP2013/071111
§ 371 (c)(1),
(2) Date: Apr. 13, 2015

(87) PCT Pub. No.: WO2014/057012
PCT Pub. Date: Apr. 17, 2014

(65) Prior Publication Data
US 2015/0276085 A1    Oct. 1, 2015

(30) Foreign Application Priority Data
Oct. 12, 2012    (DE) .................. 10 2012 218 667

(51) Int. Cl.
*F16K 31/06*    (2006.01)
*F02M 63/00*    (2006.01)
*F02M 59/36*    (2006.01)

(52) U.S. Cl.
CPC ........ *F16K 31/0675* (2013.01); *F02M 59/368* (2013.01); *F02M 63/0017* (2013.01);
(Continued)

(58) Field of Classification Search
CPC ............ F16K 31/0675; F02M 63/0075; F02M 63/0017; F02M 59/368; F02M 63/0036; Y10T 137/2087; F15D 1/0015
(Continued)

(56) References Cited

U.S. PATENT DOCUMENTS 5,464,039 A * 11/1995 Bergamini .............. G01F 1/662
                                                           137/551
5,722,633 A *  3/1998 Goossens ................ B60T 8/363
                                                           251/129.15

(Continued)

FOREIGN PATENT DOCUMENTS

CN    101990597 A     3/2011    ............. F02M 47/02
DE    19834120 A1    2/2000    ............. F02D 41/38
(Continued)

OTHER PUBLICATIONS

International Search Report and Written Opinion, Application No. PCT/EP2013/071111, 15 pages, Feb. 11, 2014.
(Continued)

*Primary Examiner* — John Bastianelli
(74) *Attorney, Agent, or Firm* — Slayden Grubert Beard PLLC

(57) ABSTRACT

A solenoid valve includes a housing, a valve actuation device, and a closing element, wherein the housing includes an interior space with a central axis, wherein the valve actuation device includes an actuator arranged in the interior space so as to be displaceable along the central axis, wherein the actuator is operatively connected to the closing element such that the solenoid valve is opened or closed by a displacement of the actuator along the central axis, wherein the actuator together with the housing delimit, in the interior space of the housing, a leakage chamber that can be filled with a fluid, e.g., a fuel, and wherein in the leakage chamber, at least one vortex generator is arranged on the housing (Continued)

and/or on the actuator, which vortex generator is configured to generate a fluid vortex in the leakage chamber.

16 Claims, 4 Drawing Sheets

(52) U.S. Cl.
CPC .... *F02M 63/0036* (2013.01); *F02M 63/0075* (2013.01); *Y10T 137/2087* (2015.04)

(58) Field of Classification Search
USPC .............................. 251/129.15, 127; 137/808
See application file for complete search history.

(56) References Cited

U.S. PATENT DOCUMENTS

| | | | | |
|---|---|---|---|---|
| 5,879,060 | A * | 3/1999 | Megerle | B60T 8/363 251/129.02 |
| 5,961,052 | A | 10/1999 | Coldren et al. | 239/585.1 |
| 6,076,490 | A * | 6/2000 | Esch | F01L 9/04 123/90.11 |
| 6,253,734 | B1 | 7/2001 | Rembold et al. | 123/446 |
| 6,279,844 | B1 | 8/2001 | Shen et al. | 239/585.4 |
| 6,512,436 | B2 | 1/2003 | Igarashi et al. | 335/281 |
| 6,644,623 | B1 * | 11/2003 | Voss | B60T 8/363 251/129.01 |
| 6,739,571 | B2 * | 5/2004 | Hironaka | F16K 31/0665 251/129.15 |
| 6,808,160 | B2 * | 10/2004 | Hayakawa | B60T 8/363 251/129.02 |
| 7,040,594 | B2 * | 5/2006 | Hironaka | F16K 31/0665 251/129.07 |
| 7,213,557 | B2 * | 5/2007 | Kondo | F02D 9/1065 123/184.53 |
| 2010/0043899 | A1 * | 2/2010 | Evanno | F02C 6/08 137/637 |
| 2010/0269934 | A1 * | 10/2010 | DeGrazia, Jr. | F23D 11/40 137/625.19 |
| 2011/0204269 | A1 * | 8/2011 | Hoppe | F16K 31/061 251/129.01 |
| 2011/0215270 | A1 * | 9/2011 | Karl | F16K 31/0693 251/129.15 |

FOREIGN PATENT DOCUMENTS

| | | | |
|---|---|---|---|
| DE | 10064253 A1 | 9/2001 | ............ F02M 51/06 |
| DE | 10016242 A1 | 10/2001 | ............ F02M 59/34 |
| DE | 60019360 T2 | 5/2006 | ............ F02M 51/06 |
| WO | 2014/057012 A1 | 4/2014 | ............ F02M 59/36 |

OTHER PUBLICATIONS

Chinese Office Action, Application No. 201380053126.9, 13 pages, Aug. 1, 2016.

* cited by examiner

SOLENOID VALVE WITH REDUCED CAVITATION

CROSS-REFERENCE TO RELATED APPLICATIONS

This application is a U.S. National Stage Application of International Application No. PCT/EP2013/071111 filed Oct. 10, 2013, which designates the United States of America, and claims priority to DE Application No. 10 2012 218 667.0 filed Oct. 12, 2012, the contents of which are hereby incorporated by reference in their entirety.

TECHNICAL FIELD

The invention relates to a solenoid valve having a housing, a valve actuation device and a closing element, wherein the housing comprises an interior space with a central axis, wherein the valve actuation device comprises an actuator, which is arranged in the interior space so as to be displaceable along the central axis, wherein the actuator is operatively connected to the closing element in order to open or close the solenoid valve by means of a displacement of the actuator along the central axis, wherein the actuator together with the housing delimit, in the interior space of the housing, a leakage space that can be filled with a fluid, in particular a fuel.

BACKGROUND

Solenoid valves for controlling a fuel flow, which comprise a housing that has an interior space in which is arranged an actuator that can be displaced into the interior space by means of a magnetic field, are known. In this case, the actuator is coupled to a valve body which is raised or lowered by the displacement of the actuator in order to open or close an outlet opening of the housing. In this case, the actuator forms in the interior space of the housing a leakage space which is filled with fuel during operation. Displacement of the actuator in the leakage space increases or reduces the volume thereof. Here, a pressure drop occurs in the leakage space when the volume is increased, leading to the occurrence of cavitation or the formation of fuel vapor bubbles in the leakage space. Upon contact with the surfaces of the housing and/or of the actuator, the cavitation causes cavitation pitting, which roughens the surface of the housing and/or of the actuator and, in the long term, destroys it owing to the high mechanical loads involved in cavitation at the surface.

SUMMARY

One embodiment provides a solenoid valve, comprising: a housing, a valve actuation device, and a closing element, wherein the housing comprises an interior space with a central axis, wherein the valve actuation device comprises an actuator, which is arranged in the interior space so as to be displaceable along the central axis, wherein the actuator is operatively connected to the closing element in order to open or close the solenoid valve by means of a displacement of the actuator along the central axis, wherein the actuator together with the housing delimit, in the interior space of the housing, a leakage space that can be filled with a fluid, e.g., a fuel, wherein in the leakage space, at least one vortex generator is arranged on the housing and/or on the actuator, which vortex generator is designed to generate a fluid vortex in the leakage space.

In a further embodiment, the housing comprises a housing end face, which faces the actuator, and the actuator comprises an actuator end face, which faces the housing end face, wherein the leakage space is delimited by the actuator end face and the housing end face, wherein the vortex generator is arranged on the actuator end face and/or on the housing end face.

In a further embodiment, the leakage space is delimited by an inner circumferential surface arranged on the housing, wherein the vortex generator comprises at least one first guide surface, wherein the first guide surface is arranged so as to slope relative to the actuator end face or to the housing end face and spaced apart radially inward in the direction of the central axis from the inner circumferential surface, wherein the first guide surface is designed to deflect the fluid in the direction of flow thereof.

In a further embodiment, the first guide surface is at an angle of 90° to 160°, in particular 120° to 140°, in particular 132° to 138°, to the housing end face or the actuator end face.

In a further embodiment, the first guide surface is arranged on the vortex generator so as to run around in a manner rotationally symmetrical with respect to the central axis of the interior space.

In a further embodiment, the vortex generator has at least one protrusion, which projects from the actuator end face and/or the housing end face.

In a further embodiment, the first guide surface is arranged on the circumference of the protrusion.

In a further embodiment, the vortex generator has at least one recess, wherein the recess has a second guide surface, wherein the second guide surface is arranged so as to slope relative to the actuator end face or to the housing end face and spaced apart radially inward in the direction of the central axis from the inner circumferential surface.

In a further embodiment, the recess is arranged spaced apart radially from the central axis of the interior space.

In a further embodiment, the recess is of groove-shaped design and is formed around the central axis of the interior space so as to run around in a rotationally symmetrical manner.

In a further embodiment, the protrusion and/or the recess have/has substantially the cross section of an isosceles trapezoid.

In a further embodiment, the second guide surface of the recess is arranged radially on the inside with respect to the first guide surface of the protrusion, in relation to the central axis.

In a further embodiment, the recess has a third guide surface situated opposite the second guide surface, wherein the third guide surface is arranged radially on the outside in relation to the central axis, spaced apart from the second guide surface, wherein the third guide surface is arranged so as to slope radially outward toward the inner circumferential surface of the leakage space.

In a further embodiment, a rounding is provided between the actuator end face or the housing end face and at least one of the first to third guide surfaces.

In a further embodiment, a gap is provided between the inner circumferential surface of the housing and the actuator, wherein a control space, which can be filled with the fluid, is formed in the interior of the housing between the closing element and the actuator, wherein the leakage space is connected to a control space via the gap, wherein the vortex generator and the gap are in fluid-dynamic operative communication.

BRIEF DESCRIPTION OF THE DRAWINGS

Example embodiments if the invention are explained in greater detail below in conjunction with the drawings, in which.

DETAILED DESCRIPTION

Figure 1:
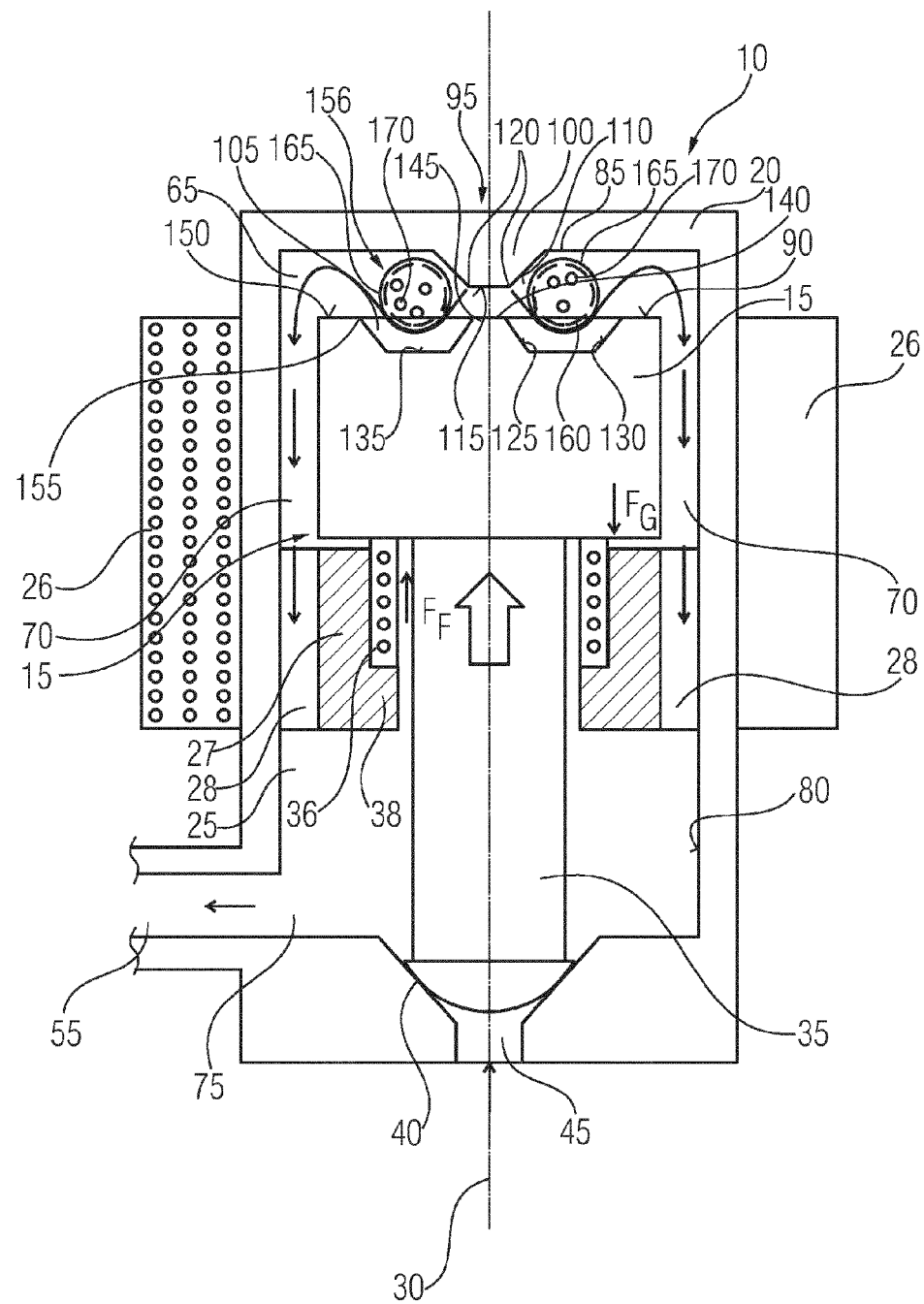
FIG. 1 shows a schematic sectional view through a solenoid valve during a lifting motion.

Embodiments of the invention to provide an improved solenoid valve in which cavitation is prevented from destroying the surfaces of the housing and/or of the actuator.

The inventors have recognized that destruction of components of the solenoid valve by cavitation can be avoided if the solenoid valve comprises a housing, a valve actuation device and a closing element. The housing comprises an interior space with a central axis. The valve actuation device has an actuator, which is arranged in the interior space so as to be displaceable along the central axis. The actuator is operatively connected to the closing element in order to open or close the solenoid valve by means of a displacement of the actuator along the central axis. Moreover, the actuator together with the housing delimit, in the interior space of the housing, a leakage space that can be filled with a fluid, e.g., a fuel. Furthermore, in the leakage space, at least one vortex generator is arranged on the housing and/or on the actuator, which vortex generator is designed to generate a fluid vortex in the leakage space.

The fluid vortex has the advantage that, when there is an increase in volume, i.e., during a lowering movement of the actuator, and an associated pressure drop in the leakage space, cavitation which arises or associated formation of fuel vapor bubbles is held by the fuel vortex in the vortex core thereof and is surrounded by a circulation of the fuel vortex, with the result that contact between the vapor bubbles and the solenoid valve and thus cavitation pitting in the solenoid valve are avoided. Moreover, the vapor bubbles, if they do come into contact with the surfaces of the solenoid valve, remain for only a very short time in one position since they are entrained by the circulation of the fluid vortex.

In another embodiment, the housing has a housing end face, which faces the actuator, and the actuator has an actuator end face, which faces the housing end face, wherein the leakage space is delimited by the actuator end face and the housing end face, and wherein the vortex generator is arranged on the actuator end face and/or on the housing end face. In this way, the axial travel required for the movement of the actuator can be kept small.

In another embodiment, the leakage space is delimited by an inner circumferential surface arranged on the housing, wherein the vortex generator comprises at least one first guide surface, wherein the first guide surface is arranged so as to slope relative to the actuator end face or to the housing end face and spaced apart radially inward in the direction of the central axis from the inner circumferential surface, wherein the first guide surface is designed to deflect the fluid in the direction of flow thereof. In this way, it can be ensured that a fluid flow flowing into the leakage space can be deflected in such a way by means of the first guide surface that the fluid vortex can be generated by means of the first guide surface.

It may be particularly advantageous if the first guide surface is at an angle of 90° to 160°, in particular 120° to 140°, in particular 132° to 138°, to the housing end face or the actuator end face. A particularly large vortex core can thereby be provided, in which a large volume of fuel or cavitation bubbles can be enclosed.

The vortex generator is particularly simple to produce if the first guide surface is arranged on the vortex generator so as to run around in a manner rotationally symmetrical with respect to the central axis of the interior space.

In another embodiment, the vortex generator has at least one protrusion, which projects from the actuator end face and/or the housing end face. This embodiment has the advantage that the actuator is of compact construction in the axial direction.

It may be advantageous if the first guide surface is arranged on the circumference of the protrusion.

It may also be advantageous if the vortex generator has at least one recess, wherein the recess has a second guide surface, wherein the second guide surface is arranged so as to slope relative to the actuator end face or to the housing end face and spaced apart radially inward in the direction of the central axis from the inner circumferential surface.

It may also be advantageous if the recess is arranged spaced apart radially from the central axis of the interior space.

It is a particularly simple matter to introduce the recess into the actuator if the recess is of groove-shaped design and is formed around the central axis of the interior space so as to run around in a rotationally symmetrical manner. As a result, the recess can be introduced into the actuator end face and/or the housing end face at low cost by means of a conventional turning or milling method or a casting method.

It has proven particularly advantageous if the protrusion and/or the recess have/has substantially the cross section of an isosceles trapezoid.

In another embodiment, the second guide surface of the recess is arranged radially on the inside with respect to the first guide surface of the protrusion, in relation to the central axis. This ensures that fluid vortex formation initiated by the first guide surface of the protrusion leads to circulation of the fluid vortex being continued at the second guide surface of the recess and fluid vortex formation being assisted by the second guide surface.

It may be particularly favorable for fluid vortex formation if the recess has a third guide surface situated opposite the second guide surface, wherein the third guide surface is arranged radially on the outside in relation to the central axis, spaced apart from the second guide surface, wherein the third guide surface is arranged so as to slope radially outward toward the inner circumferential surface of the leakage space.

A particularly powerful fluid vortex is formed if a rounding is provided between the actuator end face or the housing end face and at least one of the first to third guide surfaces.

It may be particularly favorable in terms of flow if a rounding is provided between the actuator end face and/or the housing end face and at least one of the first to third guide surfaces.

Vortex formation can also be assisted in a specific way if a gap is provided between the inner circumferential surface of the housing and the actuator, wherein a control space, which can be filled with the fluid, is formed in the interior of the housing between the closing element and the actuator, wherein the leakage space is connected to a control space, wherein the vortex generator and the gap are in fluid-dynamic operative communication. In this way, fluid can be conveyed out of the valve space into the leakage space, promoting fluid vortex formation in the leakage space in the process.

Figure 2:
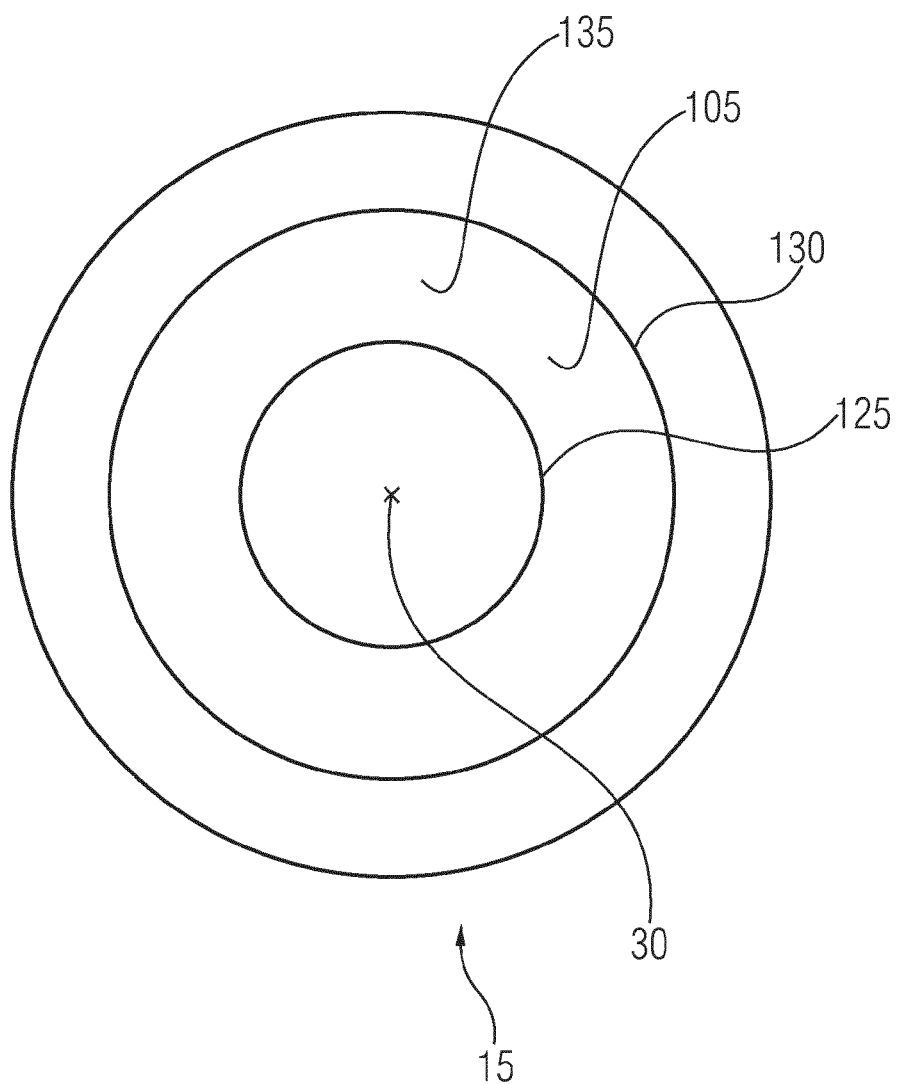
FIG. 2 shows a schematic plan view of an actuator of the solenoid valve.
Figure 3:
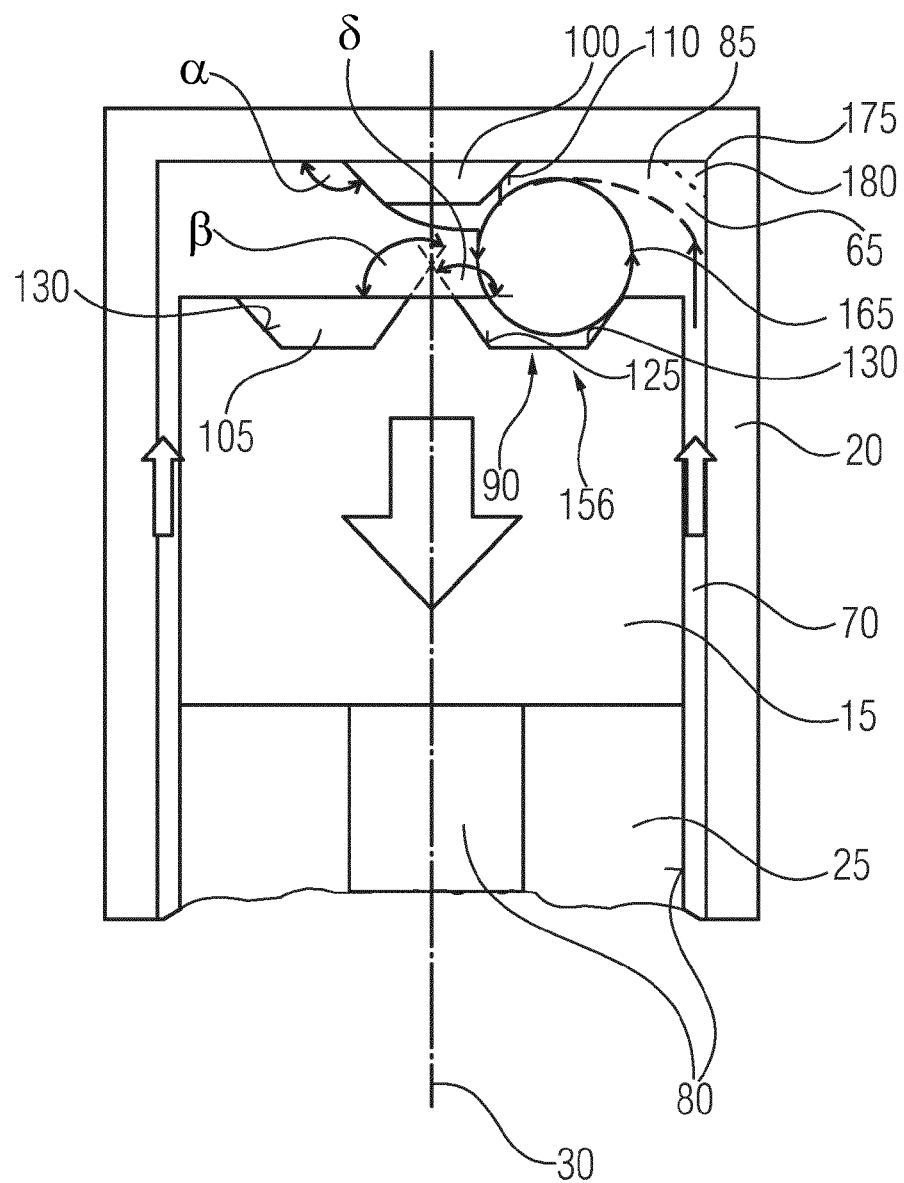
FIG. 3 shows a schematic sectional view through the solenoid valve shown in FIG. 1 during a lowering movement.

FIG. 1 shows a schematic sectional view through a solenoid valve 10 during a lifting motion. FIG. 2 shows a schematic plan view of an actuator 15 of the solenoid valve 10, and FIG. 3 shows a schematic sectional view through the solenoid valve 10 shown in FIG. 1 during a lowering motion. FIGS. 1 to 3 will be explained together below. Here, identical components are provided with identical reference signs.

The solenoid valve 10 comprises a housing 20 having an interior space 25. The actuator 15 is arranged in the interior space 25. The actuator 15 can be moved up and down in the interior space 25 along a central axis 30 of the interior space by means of coils arranged on the circumference of the housing 20. For this purpose, the coils 26 are connected to a control unit (not shown) and can be supplied with electric current. When supplied ith electric current, the coils 26 produce a magnetic field. A pole piece 27, which is supported on the circumference of the housing 20, is arranged underneath the actuator 15. Grooves 28 are provided between the pole piece 27 and the housing 20. On the underside, the actuator 15 is connected at a first longitudinal end to a closing element 35, which is seated in a valve seat 40 in a closed position and separates an inlet 45, arranged at the bottom in FIG. 1, from an outlet 55 arranged on the left-hand side. A spring element 36 is arranged in a socket 37 in the pole piece 27, between the closing element 35 and the pole piece 27. The spring element 36 surrounds the closing element 35 circumferentially and is supported by means of a first longitudinal end of the spring element 36 on the first longitudinal end of the actuator 15. By means of a second longitudinal end of the spring element 36, the spring element 36 is supported on a shoulder 38, which delimits the socket 37 in the pole piece 27. The spring element 36 is designed as a spiral compression spring and pushes the actuator 15 away from the pole piece 27 in the longitudinal direction by means of a spring force $F_F$, or upward in FIGS. 1 and 3. The shoulder 38 is furthermore designed to surround the closing element 35 circumferentially and to guide the closing element 35 during the upward and downward movement. The spring element 36 raises the closing element 35, thus exposing a passage 50 underneath the closing element 35, with the result that the inlet 45 is connected to the outlet 55 of the solenoid valve 10 and thus that a fuel or some other fluid can flow from the inlet 45 to the outlet 55. To close the inlet 45, the coils 26 are supplied with electric current, with the result that they produce a magnetic field. The magnetic field is introduced via the housing 20 into the pole piece 27, which attracts the actuator 15 and hence produces a counterforce $F_G$ to the spring force $F_F$. If the counterforce $F_G$ is greater than the spring force $F_F$, the actuator 15 moves toward the pole piece 26 until the actuator 15 strikes against the end of the pole piece 27 or until the closing element 35 is resting on the valve seat 40 and closes the inlet 45.

At the rear, at a second longitudinal end, on the side facing away from the closing element 35, the actuator 15 forms a leakage space 65 in the interior space 25 together with the housing 20. In this case, the actuator 15 has a diameter $D_A$ which is smaller than an inside diameter $D_G$ of the housing 20, with the result that a gap 70, through which the leakage space 65 is connected via the grooves 28 of the pole piece 27 to a control space 75 in which the closing element 35 is arranged, is provided between the actuator 15 and the housing 20. Here, the control space 75 is delimited by the housing 20 and the pole piece 27. In this case, the control space 75 and the leakage space 65 are filled with the fluid flowing into the solenoid valve 10 via the inlet 45.

In the embodiment, the control space 75 is connected to the leakage space 65 by means of the grooves 28 and the gap 70. As an alternative, a further gap or grooves between the closing element 35 and the shoulder 38 would also be conceivable.

In the embodiment, the actuator 15 and an inner circumferential surface 80 of the housing 20 are formed in a rotationally symmetrical manner with respect to the central axis 30. Of course, it is also conceivable for the actuator 15 and/or the housing 20 to have cross sections other than a circular cross section, such as a polygonal, an elliptical or a rectangular cross section. Apart from the inner circumferential surface 80, the leakage space 65 is also delimited in the longitudinal direction, i.e. in the direction of the central axis 30, by a housing end face 85, which faces the actuator 15, and an actuator end face 90, which faces the housing end face 85 and is arranged at the second longitudinal end of the actuator 15. The housing end face 85 and the actuator end face 85 are each of flat design and aligned perpendicularly to the central axis 30. Of course, a bent configuration of the housing end face 85 and/or of the actuator end face 90 is also conceivable. It would also be conceivable for the housing end face 85 and/or the actuator end face 90 to be arranged obliquely to the central axis 30.

A vortex generator 95 is furthermore provided in the leakage space 65. The vortex generator 95 comprises a protrusion 100, which is arranged on the housing end face 85. The vortex generator 95 furthermore comprises a recess 105, which is arranged on the actuator end face 90. Of course, the recess 105 can also be arranged on the housing end face 85, and the protrusion 100 can also be arranged on the actuator end face 90. Moreover, it is also conceivable for the recess 105 and the protrusion 100 to be arranged on the same end face, e.g. on the actuator end face 95 or on the housing end face 85. It is also conceivable for one or more recesses 105 or, alternatively, one or more protrusions 100 to be provided on the housing end face 85 and/or the actuator end face 90.

The protrusion 100 comprises a first guide surface 110, which is arranged obliquely to the central axis 30. The first guide surface 110 furthermore slopes inward radially away from the housing end face 85 in the direction of the longitudinal axis 30, with the result that the protrusion 100 tapers in the longitudinal direction toward the actuator end face 90. In this case, the first guide surface 110 is arranged around the central axis 30 so as to run around in a rotationally symmetrical manner, with the result that the protrusion 100 has a frustoconical design, which projects into the leak space 65. Owing to the rotationally symmetrical configuration of the first guide surface 110, the protrusion 100 is an isosceles trapezoid in cross section. In this case, the first guide surface 110 is aligned in such a way relative to a top surface 115 of the protrusion 100 that the top surface 115, together with the first guide surface 100, forms a first separation edge 120. In this case, the top surface 115 is aligned perpendicularly to the central axis 30 of the interior space 25 and thus parallel to the housing end face, with the result that the separation edge 120 is formed around the central axis 30 so as to run around in a circle.

Of course, it is also conceivable for the protrusion 100 to be arranged transversely to the central axis 30 on the housing end face 85. In this case, the protrusion 100 can also have a configuration which is not rotationally symmetrical.

The recess 105 has a second guide surface 125 and a third guide surface 130. In this case, the recess 105 is of groove-shaped configuration, with the result that the second guide surface 125 and the third guide surface 130 form the side face of the groove. The second guide surface 125 is connected to the third guide surface 130 by a recess bottom 135. In this case, the second guide surface 125 is arranged radially on the inside with respect to the first guide surface 110 of the protrusion.

The third guide surface 130 is arranged radially on the outside both with respect to the first guide surface 110 and to the second guide surface 125. The second guide surface 125 and the third guide surface 130 are likewise aligned obliquely to the central axis 30, wherein the second guide surface 125 is arranged relative to the third guide surface 130 at the recess bottom 135 in such a way that the recess 105 opens in the direction of the housing end face 85 and hence the recess 125 is of wider configuration at an end of the recess 105 facing the housing end face 85 than at the recess bottom 135 and thus has the shape of an isosceles trapezoid in cross section. In this case, the recess bottom 135 is aligned transversely to the central axis 30 and runs around the central axis 30 in a rotationally symmetrical manner in a ring.

A second separation edge 145 is formed by the recess 105 radially on the inside on the second guide surface 25, at the transition to an actuator end face 90. A first portion 140 of the actuator end face 90 is provided radially on the inside with respect to the second separation edge 145. Owing to the perpendicular arrangement of the actuator end face 90 to the central axis 30, the second separation edge 145, which is arranged centrally on the central axis 30, is of circular design. Radially on the outside, a third separation edge 155 is formed between the actuator end face 90 and the third guide surface 130. The third separation edge 155 is likewise of circular design and arranged centrally with respect to the central axis 30. A second portion 150 of the actuator end face 90 is arranged radially on the outside between the third separation edge 155 and the inner circumferential surface 80. The first portion 140 and the second portion 150 of the actuator end face 90 are arranged in the same plane perpendicularly to the central axis 30. Of course, it is also conceivable for the first portion 140 to be arranged spaced apart axially in the direction of the central axis 30 from the second portion 150.

As the fuel is forced out during a lifting motion of the actuator 15 in the interior space 25 of the housing 20, fuel is pushed out of the leakage space 65 into the control space 75 through the gap and the grooves 28. During this process, the fuel flow (indicated by means of arrows in the figures) is guided in the leakage space 65 by the vortex generator 95 or by the protrusion 100 and the recess 105 in such a way that a vortex 156 is brought about in the leakage space 65 with a circulation 160 and a fuel vortex core 165 situated within the circulation 160. In FIGS. 1 and 3, the circulation 160 is indicated schematically in a symbolic way by means of arrows. The fuel vortex core 165 is indicated by means of dashed lines. In this case, the fuel situated at the housing end face 85 flows radially inward and is guided in the direction of the actuator end face 90 by the first guide surface 110. After crossing the leakage space 65 axially, the fuel flow impinges upon the second guide surface 125 and is guided radially outward by said surface. After flowing past the recess bottom 135, the fuel flow is deflected in the direction of the housing end face 85 by the third guide surface 130 and then flows through the gap 70 into the control space 75. Owing to the continuous flow of additional fuel and the design of the vortex generator 95, the vortex 156 has a toroidal form, the central axis of which is situated on the central axis 30 of the interior space 25. The circulation 160 of the vortex 156 revolves between the protrusion 100 and the first portion 140 or the second guide surface 125 of the protrusion 100 in the direction of the recess 105, both during a lifting motion and during a lowering motion. The circulation 160 of the fuel vortex 156 has the effect that a region of reduced pressure is formed in the fuel vortex core 165.

If, as shown in FIG. 3, the actuator 15 is guided in a lowering motion to close the solenoid valve 10, with the result that the closing element 35 moves in the direction of the valve seat 40, the volume of the leakage space 65 is increased. Owing to the fact that the movements of the solenoid valve 10 or the actuator take place very quickly and with a high clock rate, vapor bubbles 170 or cavitation form/forms in the leakage space 65 owing to the reduced pressure in the leakage space 65 that forms during a lowering motion. Upon contact with the material of the actuator 15 or the inner circumferential surface 80 or housing end face 85, the vapor bubbles lead to cavitation pitting or roughening of the surface of the actuator 15 or of the housing 20.

During a lowering motion, the fuel is drawn out of the control space 75 through the gap 70 and the grooves 28 and conveyed into the leakage space 65. During this process, the fuel flows along the inner circumferential surface 80 parallel to the central axis 30 of the interior space 25 in the direction of the housing end face 85. The fuel flow, which is illustrated on the right-hand side in FIG. 3, is explained below. The fuel flow flowing in parallel to the central axis 30 is deflected radially inward by the housing end face 85 in the direction of the protrusion 100, with the result that it is guided parallel to the housing end face 85. The first guide surface 110 deflects the fuel in the direction of the actuator end face 90, with the result that the fuel flows from the first guide surface 110 in the direction of the second guide surface 125. The second guide surface 125 guides the fuel flow to the recess bottom 135, with the result that the fuel flow then flows radially outward substantially transversely to the central axis 30. The third guide surface 130 deflects the fuel flow again in such a way that it flows in the direction of the housing end face 85 and combines with the additional fuel flowing through the gap 70. A rotating vortex 156 with a toroidal shape is thereby formed between the housing end face 85 and the actuator end face 90. Vapor bubbles 170 or cavitation forming owing to the pressure reduction in leakage space 65 is/are captured by the region of reduced pressure in the fuel vortex core 165 and the circulation 160 prevents the vapor bubbles 170 from coming into contact with the material of the solenoid valve 10 and thereby possibly damaging it. The toroidal shape of the vortex 156 offers the advantage that a particularly tall and large fuel vortex core 165 is formed in a ring around the central axis 30 in the leakage space 65, thus allowing a particularly large number of vapor bubbles 170 to be captured there. Furthermore, the toroidal vortex 156 has a particularly high stability. Moreover, energy is supplied to the vortex 156 through the configuration of the vortex generator, both during the lifting and during the lowering motion of the actuator 15, with the result that the vortex 156 rotates in a stable manner in the leakage space 65 and has a particularly high circulation 160. In this context, a stable fuel vortex core 165 is formed only if the guide surface 110, 125, 130 is arranged relative to the housing end face 85 or the actuator end face 90 in such a way that the fuel flow separates at the respective separation edge 120, 145, 155 arranged between the guide surface 110, 125, 130 and the top surface 115, 140, 150.

Figure 4:
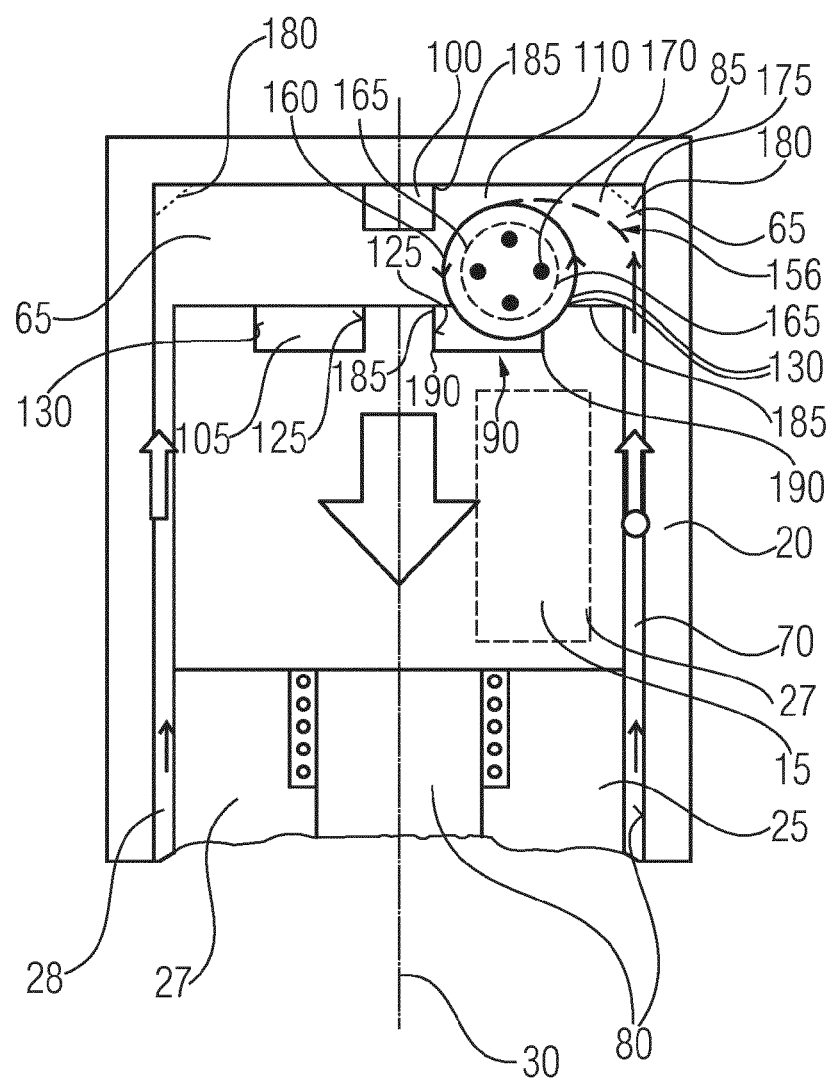
FIG. 4 shows a schematic sectional view through alternative embodiments of the solenoid valve 10 shown in FIGS. 1 to 3.

FIG. 4 shows a schematic sectional view through an alternative embodiment of the solenoid valve 10 shown in FIGS. 1 to 3. The solenoid valve 10 is of substantially identical design to the solenoid valve 10 shown in FIGS. 1 to 3. As a departure therefrom, the guide surfaces 110, 125, 130 are arranged parallel to the central axis 30 and perpendicular to the housing end face and the actuator end face 90. In order to improve the circulation 160 of the fuel vortex 156, a rounding 185 is formed on the respective separation edge 120, 145, 155 between the guide surfaces 110, 125, 130 and the corresponding housing end face 85 or armature surface 90, as illustrated by way of example on the right-hand side of the central axis 30 in the figure. A further rounding 190 is likewise provided between the second and the third guide surface 125, 130 and the recess bottom 135. As an alternative, it is also conceivable to make the separation edges 185, 190 sharp-edged, as shown on the left-hand side of the central axis 30 in FIGS. 1 to 3 and in FIG. 4. Reliable separation of the flow of the fuel at the separation edge 185, 190 is thereby ensured.

Although the invention has been explained and described more specifically in detail by means of the preferred illustrative embodiment, the invention is not restricted by the examples disclosed, and other variations can be derived therefrom by a person skilled in the art without exceeding the scope of protection of the invention.

Thus, it is entirely conceivable that a fourth guide surface 180 (illustrated in dashed lines in FIG. 4) should be arranged in a corner region, i.e. the transitional region between the housing end face 85 and the inner circumferential surface 80 of the housing 20. In this way, the fuel flow can be deflected through the gap 70 in the direction of the protrusion 100 by the fourth guide surface 180 even as it flows in, and an increased circulation 160 is thus achieved.

It is also conceivable to make the protrusion 100 and/or the recess 105 wider or narrower than shown in the figures. It is, of course, also conceivable to provide two or more recesses 105. Instead of the arrangement of a protrusion 100 opposite to a recess 105, it would also be conceivable to arrange a respective protrusion 100 or a respective recess 105 on the housing end face 85 or on the actuator end face 90.

The solenoid valve 10 is filled with fuel in FIGS. 1 to 4. Of course, other fluids are also conceivable for filling the solenoid valve 10, in particular water, fuels or oils. However, the vortex generator 95 should be configured in accordance with the viscosity of the fluid.

The first guide surface 110 encloses a first angle α with the housing end face 85. The second guide surface 125 and the third guide surface 130 enclose a second and a third angle β, δ respectively with the actuator end face 90. The angles α, β, δ may be 90° to 160°, in particular 120° to 140°, in particular 132° to 138°. In the embodiments shown, the angles α, β, δ chosen are equal. Of course, the angles α, β, δ chosen can also be different from one another.

What is claimed is:

1. A solenoid valve, comprising:
a housing including an interior space with a central axis,
a valve actuation device including an actuator arranged in the interior space and movable along the central axis,
a closing element operatively connected to the actuator to open or close the solenoid valve upon displacement of the actuator along the central axis,
a leakage space in the interior space defined by an actuator end face normal to the central axis together with a housing end face facing the actuator end face and the fillable with a fluid flowing between the housing and one or more sides of the actuator, and
at least one vortex generator arranged in the leakage space on at least one of the housing end face or the actuator end face and not along lateral sides of the actuator, the vortex generator configured to generate a fluid vortex in the leakage space.

2. The solenoid valve of claim 1, wherein:
the leakage space is delimited by an inner circumferential surface arranged on the housing, and
the vortex generator comprises at least one first guide surface having a slope relative to the actuator end face or to the housing end face and spaced apart radially inward in a direction of the central axis from the inner circumferential surface, wherein the first guide surface is configured to deflect the fluid in a flow direction of the fluid.

3. The solenoid valve of claim 2, wherein the slope of the at least one first guide surface is at an angle between 90° and 160°, inclusive.

4. The solenoid valve of claim 2, wherein the first guide surface extends around the central axis of the interior space in a rotationally symmetrical manner.

5. The solenoid valve of claim 1, wherein the vortex generator has at least one protrusion projecting from at least one of the actuator end face or the housing end face.

6. The solenoid valve of claim 5, wherein the vortex generator comprises at least one first guide surface having a slope relative to the actuator end face or to the housing end face and spaced apart radially inward in a direction of the central axis from the inner circumferential surface, wherein the first guide surface is configured to deflect the fluid in a flow direction of the fluid, and
the first guide surface is arranged on the circumference of the protrusion.

7. The solenoid valve of claim 2, wherein the at least one first guide surface includes a recess having a slope relative to the actuator end face or to the housing end face and spaced apart radially inward in a direction of the central axis from the inner circumferential surface.

8. The solenoid valve of claim 7, wherein the recess is radially spaced apart from the central axis of the interior space.

9. The solenoid valve of claim 7, wherein the recess is groove-shaped and extends the central axis of the interior space in a rotationally symmetrical manner.

10. The solenoid valve of claim 1, wherein the vortex generator comprises:
a protrusion defining the at least one first guide surface projecting from at least one of the actuator end face or the housing end face; and
a recess defining a second guide surface having a slope relative to the actuator end face or to the housing end face and spaced apart radially inward in a direction of the central axis from the inner circumferential surface; and
at least one of the protrusion or the recess has a cross section with an isosceles trapezoid shape.

11. The solenoid valve of claim 1, wherein the vortex generator comprises:
a protrusion defining the at least one first guide surface projecting from at least one of the actuator end face or the housing end face; and a recess defining a second guide surface having a slope relative to the actuator end face or to the housing end face and spaced apart radially inward in a direction of the central axis from the inner circumferential surface; and the recess is arranged radially on the inside with respect to the protrusion, in relation to the central axis.

12. The solenoid valve of claim 11, wherein the recess has a third guide surface situated opposite the second guide surface, wherein the third guide surface is arranged radially on the outside in relation to the central axis, spaced apart from the second guide surface, wherein the third guide surface has a slope radially outward toward the inner circumferential surface of the leakage space.

13. The solenoid valve of claim 12, comprising a rounding between (a) the actuator end face or the housing end face and (b) at least one of the first, second, or third guide surfaces.

14. The solenoid valve of claim 1, further comprising a gap between the inner circumferential surface of the housing and the actuator,
   wherein a control space that is fillable with the fluid is formed in the interior of the housing between the closing element and the actuator, and
   wherein the leakage space is connected to the control space via the gap, wherein the vortex generator and the gap are in fluid-dynamic operative communication.

15. The solenoid valve of claim 2, wherein the first guide surface is at an angle of between 120° to 140°, inclusive.

16. The solenoid valve of claim 2, wherein the first guide surface is at an angle of between 132° to 138°, inclusive.

* * * * *